United States Patent [19]

White, III et al.

[11] Patent Number: 5,042,238
[45] Date of Patent: Aug. 27, 1991

[54] RIDING LAWN MOWER

[75] Inventors: Donald M. White, III, Chanhassen; Henry B. Tillotson, Minneapolis; Richard A. Thorud, Bloomington, all of Minn.

[73] Assignee: The Toro Company, Minneapolis, Minn.

[21] Appl. No.: 467,283

[22] Filed: Jan. 17, 1990

Related U.S. Application Data

[63] Continuation of Ser. No. 379,766, Jul. 14, 1989, abandoned.

[51] Int. Cl.$^5$ ............................................. A01D 61/02
[52] U.S. Cl. ................................. 56/11.8; 180/6.24; 280/211
[58] Field of Search ....................... 56/10.1, 10.8, 11.7, 56/11.8, 13.5, 14.3, 14.7; 180/6.24, 6.26; 280/96, 211

[56] References Cited

U.S. PATENT DOCUMENTS

| | | | |
|---|---|---|---|
| 2,191,961 | 2/1940 | Howell | 280/95 |
| 2,659,445 | 11/1953 | Church | 180/6.32 |
| 2,886,118 | 5/1959 | Strunk | 180/6.26 |
| 2,899,793 | 8/1959 | Swisher | 56/14.7 X |
| 3,528,682 | 9/1970 | Lohr et al. | 280/211 |
| 3,599,407 | 8/1971 | Bichel | 56/11.8 |
| 3,613,815 | 10/1971 | Meylink | 56/11.7 X |
| 3,702,051 | 11/1972 | Deines | 56/11.3 |
| 3,766,722 | 10/1973 | Kamlukin et al. | |
| 3,796,275 | 3/1974 | Bouyer | 180/6.4 |
| 3,925,970 | 12/1975 | Rusco | 56/14.7 |
| 3,984,967 | 10/1976 | Jones | 56/11.8 |
| 4,132,121 | 1/1979 | Clarke | 56/11.8 X |
| 4,293,050 | 10/1981 | Goloff et al. | 180/6.24 |
| 4,318,266 | 3/1982 | Taube | |

FOREIGN PATENT DOCUMENTS

| | | |
|---|---|---|
| 525211 | 9/1921 | France . |
| 1024104 | 3/1953 | France . |
| 588022 | 5/1947 | United Kingdom . |
| 684380 | 12/1952 | United Kingdom . |

*Primary Examiner*—Thuy M. Bui
*Attorney, Agent, or Firm*—James W. Miller

[57] ABSTRACT

An improved riding lawn mower comprises a frame having steerable front wheels and rear traction wheels. Each rear wheel is independently driven by a separate transmission. A steering wheel is used to turn the front wheels to control the direction of movement of the rider. Linkage assemblies connected to the steering assembly declutch the rear wheel on the inside of a sharp turn to give the mower near ZTR turning ability. However, the declutched rear wheel freewheels to avoid tearing the turf and the mower does not speed up during the turn.

27 Claims, 5 Drawing Sheets

RIDING LAWN MOWER

This application is a continuation of application Ser. No. 07/379,766, filed July 14, 1989, now abandoned.

TECHNICAL FIELD

The present invention relates generally to riding lawn mowers and, more particularly, to riding lawn mowers having an extremely small turning radius.

BACKGROUND OF THE INVENTION

Riding lawn mowers are well known and typically comprise wheeled frames having an engine, a seat for supporting an operator, and a cutting deck having a rotary blade for cutting grass or other ground growing vegetation. A transmission suitably connects the engine to the rear or driving wheels of the lawn mower for self-propelling the mower over the ground. In many cases, such lawn mowers also include a pair of steerable front wheels controlled by a steering wheel adjacent the operator's seat. The operator sits on the seat and controls the operation of the mower, i.e. its direction, its speed of movement, the operation of the cutting deck, etc., by suitable manipulation of various control elements, i.e. the steering wheel, a throttle control and/or a gear selection lever on the transmission, a blade engagement lever, etc.

In using riding lawn mowers, there are often many situations in which a mower having a high degree of maneuverability is desirable. For example, if the area to be mowed has a number of trees or bushes, or if there are tight spots into which the mower must go, then maneuverability is quite important to the speedy conclusion of the job. Most conventional riding mowers of the type described above, in which the rear wheels are continuously driven, are not as maneuverable as one would like due to their relatively large turning radius.

Accordingly, various mowers having a small or zero turning radius have attempted to increase rider maneuverability. Many such mowers use less stable front caster wheel or three wheel arrangements rather than a true four wheel configuration. Many such mowers do not have a conventional steering wheel, but use two control levers or joysticks which the operator has to manipulate to clutch and declutch the rear driven wheel on the inside of the turn. Such controls are confusing for most people to use and this decreases the safety of operation.

In addition, many prior art ZTR mowers use a differential to drive the rear wheels. When such mowers are turned sharply in a ZTR fashion, i.e. by decreasing the drive to one of the drive wheels, they speed up in an undesirable fashion. This speed increase can be startling to the operator and increases the forces on the operator tending to throw the operator off the machine. This again makes safe operation of the product somewhat more difficult. Moreover, many known ZTR's also effect a sharp turn by completely braking or stopping the drive wheel on the inside of the turn. In many cases, this tears a divot in the turf at the spot of the braked wheel, which is obviously undesirable.

SUMMARY OF THE INVENTION

One aspect of this invention is to provide a riding lawn mower having near ZTR ability without having the disadvantages of prior art ZTR machines.

An improved riding lawn mower according to this invention comprises a frame supported for movement over the ground by a pair of steerable front wheels and a pair of rear wheels. A steering wheel on the frame is connected to the front wheels for rotating the front wheels relative to the frame for changing the direction of movement thereof. A prime mover is carried on the frame and a transmission system drives the rear wheels from the prime mover. A means is operatively connected to the steering wheel for declutching the rear wheel on the inside of the turn in response to turning the front wheels.

BRIEF DESCRIPTION OF THE DRAWINGS

The present invention will be described hereafter in the Detailed Description, taken in conjunction with the following drawings, in which like reference numerals refer to like elements or parts throughout.

DETAILED DESCRIPTION

Figure 1:
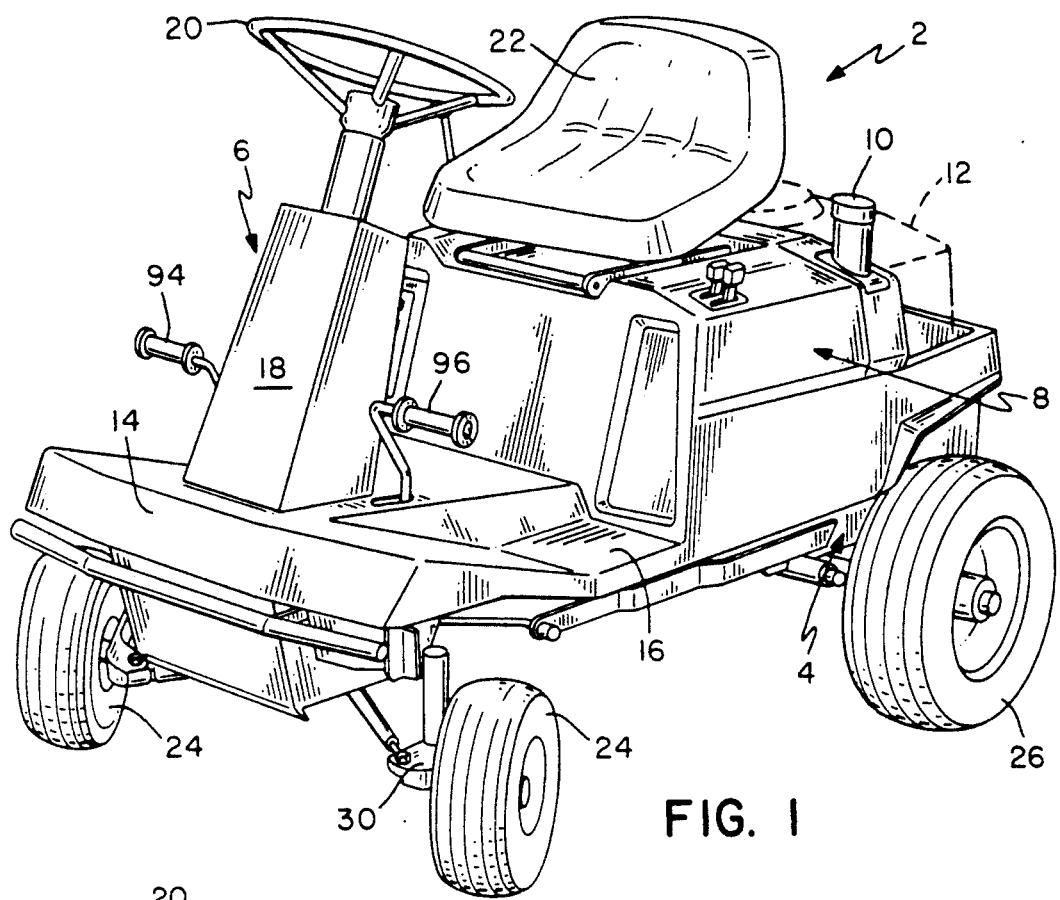
FIG. 1 is a perspective view of an improved riding lawn mower according to the present invention, in which the cutting deck thereof is not shown for the purpose of clarity.
Figure 2:
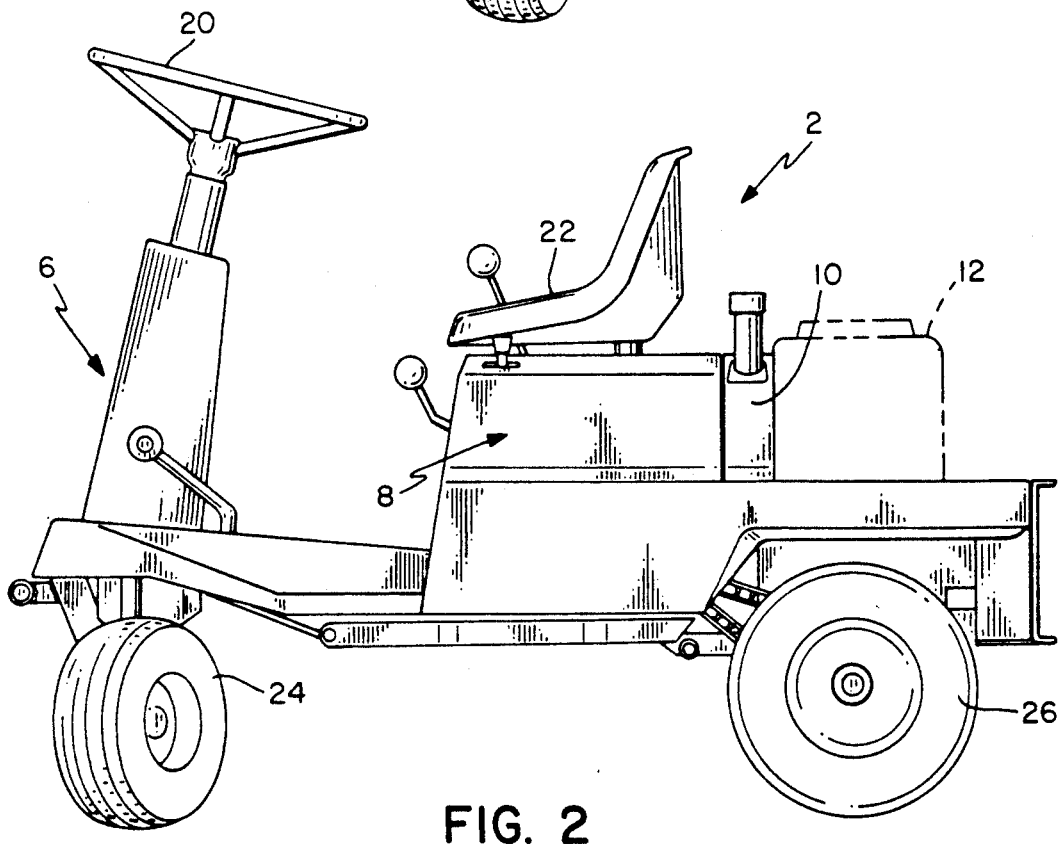
FIG. 2 is a side elevational view of the riding lawn mower shown in FIG. 1.

Referring first to FIGS. 1 and 2, an improved riding lawn mower according to the present invention is generally illustrated as 2. Lawn mower 2 includes a frame assembly 4 having a steering tower assembly 6 fixed to the front portion thereof and a body assembly 8 fixed to the rear portion thereof. Body assembly 8 has an open engine compartment at the back in which a fuel tank 10 and an engine 12 are located. Engine 12 is preferably an internal combustion engine, but any suitable prime mover could be used.

Steering tower assembly 6 includes a floor pan 14 having left and right foot tread portions 16. An upright steering tower 18 is located on the front of floor pan 14 in the middle thereof and is suitably spaced in front of body assembly 8 to allow an operator sufficient room to mount and dismount mower 2. A rotatable steering wheel 20 used for controlling the direction of movement of mower 2 is carried atop tower 18. A seat 22 for supporting the operator is located on top of body assembly 8 at the front thereof. When an operator is sitting in seat 22 and is facing forwardly, the operator will be able to comfortably grasp steering wheel 20 with the operator's feet resting on foot treads 16.

Mower 2 is supported for movement over the ground by a pair of steerable front wheels 24 and a pair of rear traction wheels 26. A cutting deck (not shown) enclosing one or more generally horizontal rotary cutting blades is suspended beneath the middle of mower 2 between the front and rear wheels 24 and 26. The cutting deck is connected to mower 2 by a height of cut assembly shown generally as 28 in FIG. 3.

Height of cut assembly 28 can be manipulated manually by the operator to adjust the height of the cutting deck above the ground. The blades carried by the cutting deck may be placed in operation using any suitable driving means, such as drive belts, operatively connected to engine 12. When such blades are rotating, they sever grass at the height determined by the setting of the height of cut assembly 28 as mower 2 is driven over the ground. The cutting deck and the height of cut assembly 28 may be any one of numerous conventional and well known types of such components, and their exact construction and operation are not important in understanding the present invention.

An important and unique feature of mower 2 is its ability to operate in a near zero turning radius (i.e. ZTR) mode while utilizing a true four wheel configuration having conventional steering, i.e. steerable front wheels operated by a rotatable "automotive type" steering wheel. Thus, mower 2 is stable, yet highly maneuverable for cutting in tight places, all while avoiding the uncommon and confusing control sticks or levers of most prior art ZTR mowers. In addition, mower 2 is ruggedly built using simple and cost effective mechanical components designed to function properly in the dusty and debris filled environment in which mower 2 is normally used. Thus, mower 2 also avoids the relatively expensive hydraulic systems used in some prior art ZTR mowers or the relatively unreliable mechanical systems used in other prior art ZTR mowers.

Figure 4:
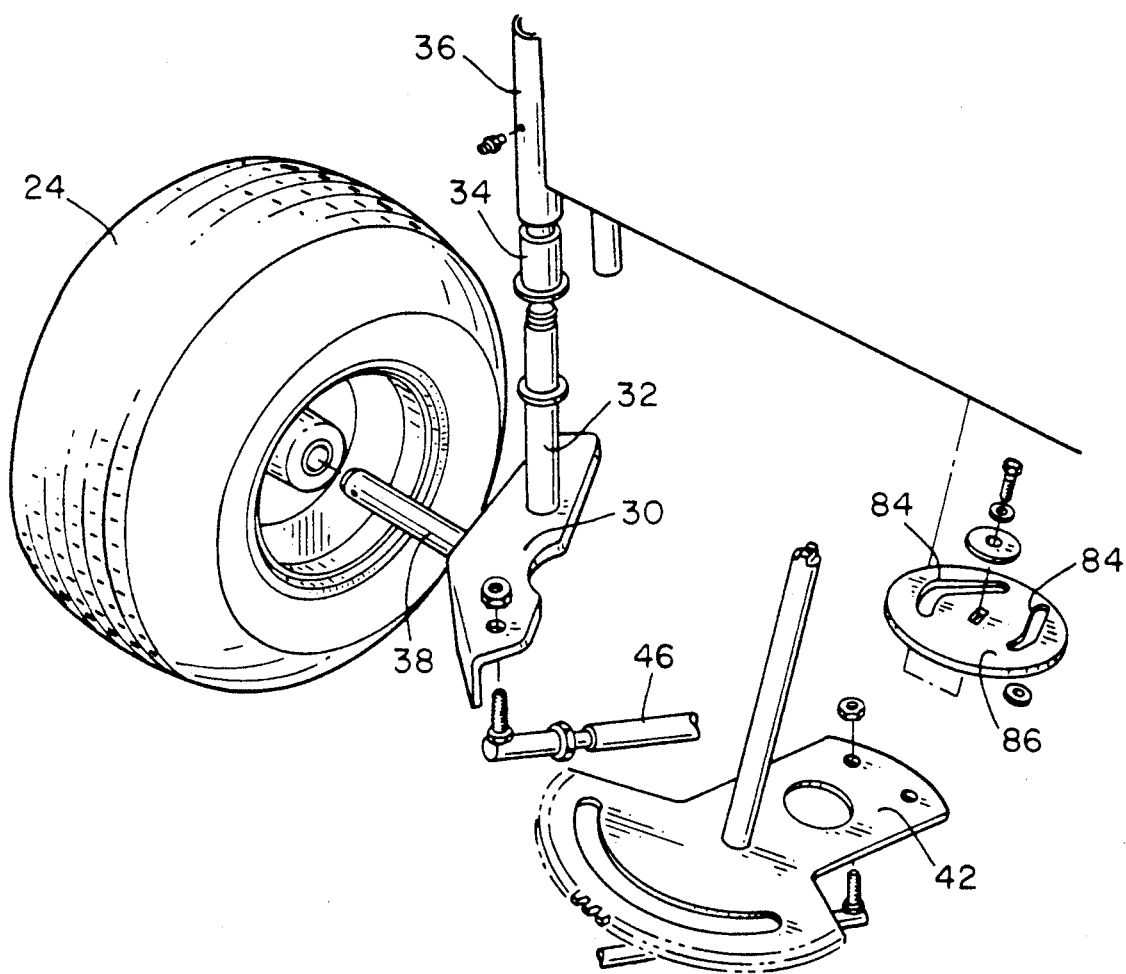
FIG. 4 is an exploded perspective view of the steering assembly for the riding lawn mower shown in FIG. 1.

Referring now to FIGS. 1 and 4, each of the front wheels 24 is rotatably supported on frame assembly 4 by a spindle plate 30 having an upwardly extending pivot rod 32. Pivot rod 32 is rotatably journalled and held in a bushing 34 carried on each end of a front axle 36 fixed to frame assembly 4. A generally horizontal stub shaft 38 extends outwardly from spindle plate 30. One wheel 24 is secured to and rotatably carried on stub shaft 38. Wheel 24 turns relative to frame assembly 4 by rotating spindle plate 30.

Figure 3:
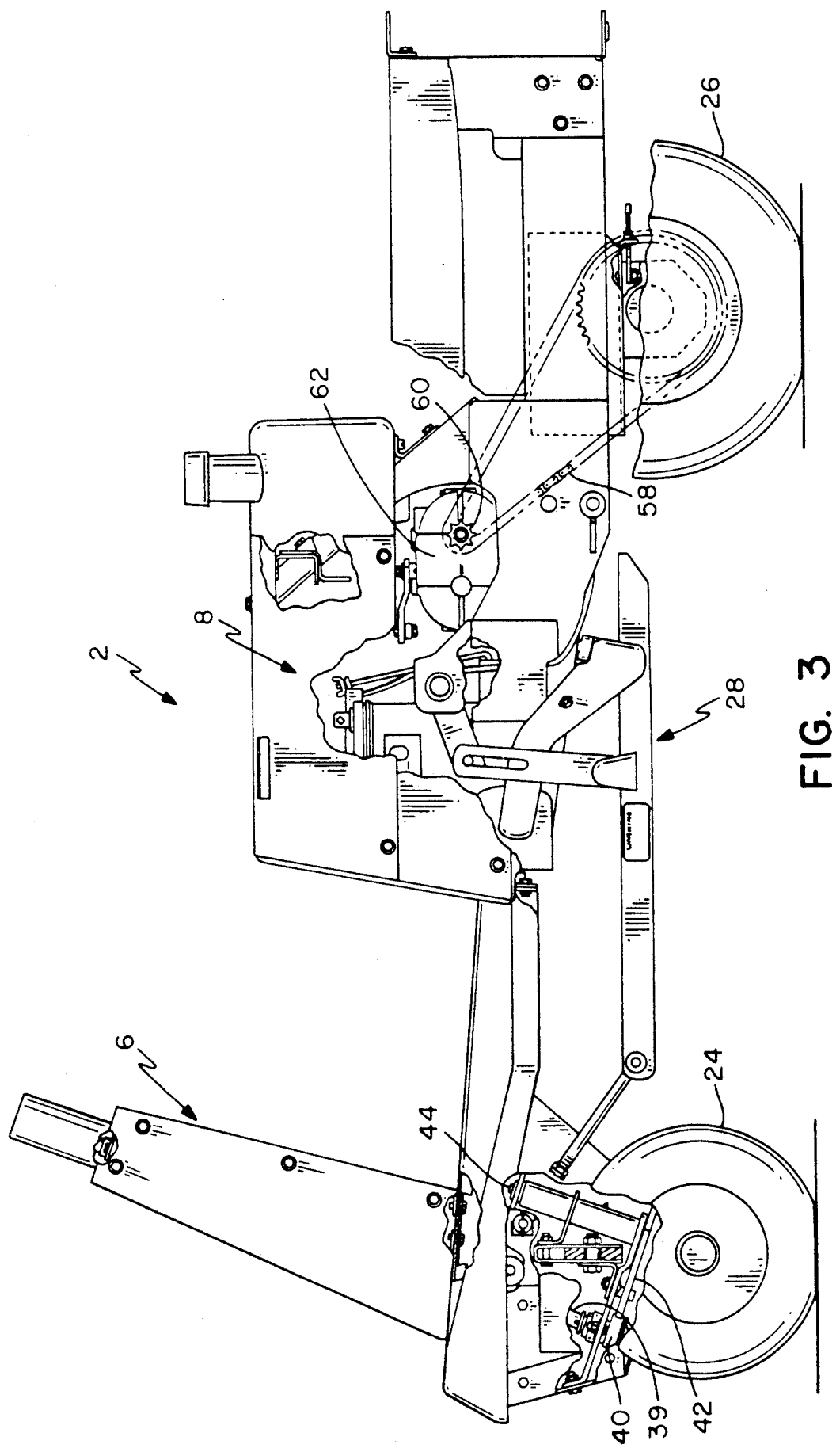
FIG. 3 is a side elevational view of the riding lawn mower shown in FIG. 1, with portions thereof broken away to illustrate the steering assembly and one of the dual transmissions of the lawn mower.
Figure 5:
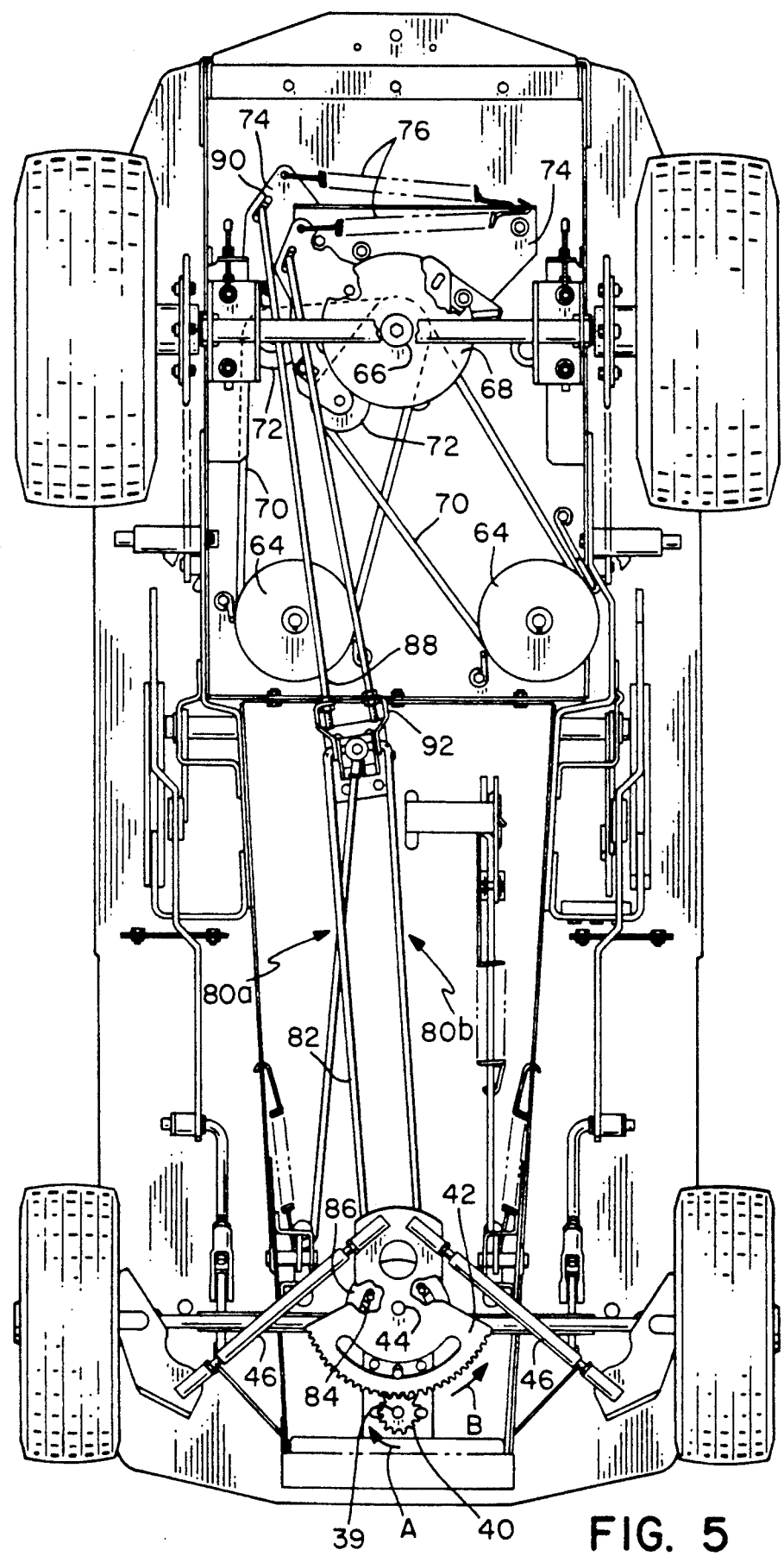
FIG. 5 is a bottom plan view of the riding lawn mower shown in FIG. 1, particularly illustrating the linkage assemblies for controlling the operation of the rear drive wheels in accordance with the operation of the steering assembly, and in which the mower is illustrated as travelling straight ahead.

As shown in FIGS. 3, 4 and 5, a steering assembly is provided for connecting the steering wheel 20 to spindle plates 30 so rotation of steering wheel 20 turns front wheels 24. The steering assembly includes a steering shaft 39 extending downwardly from steering wheel 20 through tower 18 to terminate in a lower end which carries a toothed pinion 40. Pinion 40 engages a toothed rack 42 which is rotatably supported on frame assembly 4 by a pivot rod 44. Two elongated tie rods 46 are secured to the rear of rack 42 in back of pivot rod 44 and extend forwardly therefrom to be secured to the front of spindle plates 30 in front of the location of pivot rod 32.

The steering assembly noted above provides "Ackerman" type steering in which the front wheel 24 on the inside of the turn is turned at a sharper angle than the front wheel 24 on the outside of the turn. In addition, the particular arrangement of tie rods 46 allows front wheels 24 to be turned very sharply, up to approximately 80° for the wheel 24 on the inside of the turn. In fact, front wheels could be turned greater than 80° but for the fact that stops (not shown) limit the maximum degree of turn to approximately 80°. Both of these aspects contribute to the high degree of maneuverability of mower 2 in conjunction with the interconnection of front wheels 24 to the operation of traction wheels 26, as will be described later.

Figure 6:
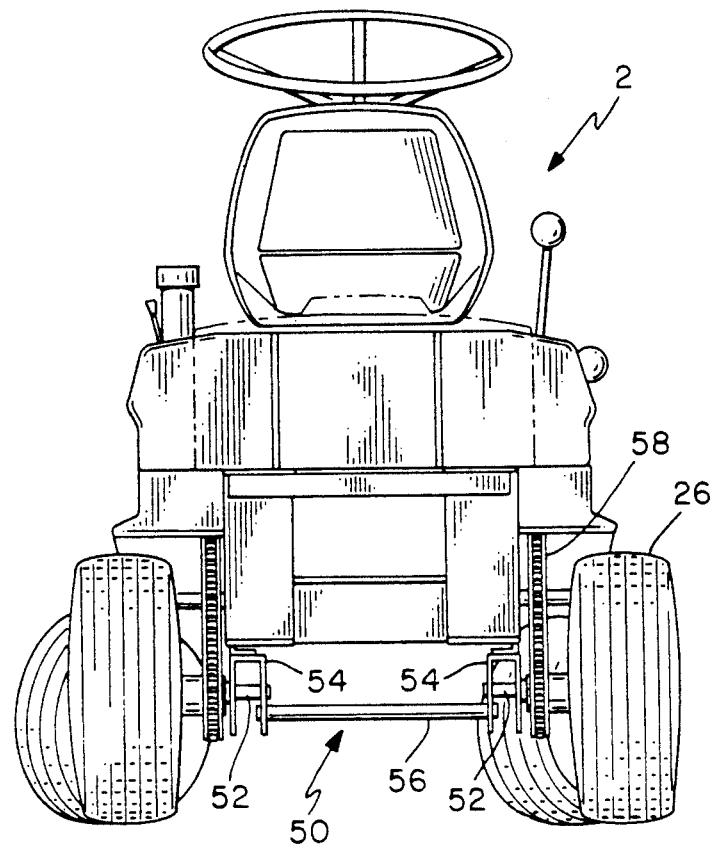
FIG. 6 is a rear elevational view of the riding lawn mower shown in FIG. 1, particularly illustrating the rear axle assembly thereof.

Referring now to FIG. 6, each of the rear traction wheels 26 is rotatably carried on one end of a fixed rear axle assembly illustrated generally as 50. Rear axle assembly 50 is a welded structure comprising two outwardly extending stub shafts 52 secured to U-shaped support brackets 54 above the level of the main rear axle portion 56. The main rear axle portion 56 has to have a predetermined clearance to the bottom of frame assembly 4 to accommodate a drive pulley 68 on the engine output shaft which is positioned immediately above axle assembly 50. However, since stub shafts 52 are above the level of main rear axle portion 56, in effect making a U-shaped rear axle assembly with drive pulley 68 located in the U, the height of mower 2 is somewhat decreased, leading to increased stability. All this accomplished with a rear axle assembly 50 which is strong and durable.

In any event, each rear wheel 26 is rotatably journalled on one of the stub shafts 52 and is independently driven by a separate chain and sprocket drive 58 which leads upwardly from stub shaft 52 to the output sprocket 60 of a separate mechanical transmission 62. The use of two identical mechanical transmissions 62 (only the left side transmission 62 is shown in FIG. 3) to separately and independently drive each of the rear wheels 26 is a novel feature of this invention and adds to the durability and ruggedness of mower 2 while serving as part of the means for achieving ZTR operation. Preferably, each transmission is a multi-speed draw key type transmission having a sealed housing, a plurality of speed change gears, and a sliding type shift key for coupling a selected one of the speed change gears to the output shaft of the transmission. One transmission that is suitable is the left hand Peerless Transmission Model No. 700-030 and its right hand counterpart, Peerless Model No. 700-029.

Referring now to FIG. 5, the input shafts to each of the transmissions 62 carry an input pulley 64 beneath frame assembly 4. The output shaft 66 of engine 12 has a drive pulley 68 with grooves for two drive belts 70 which, respectively, extend from drive pulley 68 out around one of the transmission input pulleys 64. Two idler pulleys 72 carried on two pivotal support arms 74 are used, respectively, to tension the drive belts 70. Bias springs 76 urge support arms 74 in a direction which tensions drive belts 70. Thus, belts 70 are normally tight and in a driving condition where power is transferred from the engine output shaft 62 to the input shaft of transmissions 62, and from there out to rear wheels 26 as long as transmissions 62 are in gear.

As will be described in more detail hereafter, turning front wheels 24 to turn mower 2 to one side or the other also clutches or declutches the traction wheel 26 on the inside of the turn to give mower 2 a very small turning radius. This is an important portion of the ZTR ability of mower 2.

The means for clutching rear wheels 26 by turning front wheels 24 comprises a left-hand linkage assembly 80a and a right-hand linkage assembly 80b which are generally identical, the left-hand assembly 80a selectively declutching the left hand transmission 62 and the right-hand assembly 80b declutching the right hand transmission 62. Each assembly 80 includes a front link arm 82 having its front end turned down to extend into an arcuate slot 84 on a rotatable plate 86. Plate 86 is carried on the upper end of pivot rod 44 to rotate in concert and in the same direction as toothed rack 42. When rack 42 is straight ahead corresponding to a straight direction for front wheels 24, each of link arms 82 is in engagement with one end of slot 84 as shown in FIG. 5.

In addition, each assembly 80 also includes a rear link arm 88 having a rear end turned up to fit into a slot 90 in one of the pivotal support arms 74. However, unlike front link arm 82 which engages one end of slot 84 when mower 2 is travelling straight ahead, link arm 88 has its rear end positioned approximately in the middle of slot 90 when mower is travelling straight. Both front and rear link arms 82 and 88 are fixed together by a middle connecting bracket 92 so that link arms 82 and 88 really act as a single fixed link arm. The use of two separate link arms 82 and 88 connected together by a bracket 92 is required because of certain elevational changes required in traversing beneath frame assembly 4. However, link arms 82 and 88 could be replaced by a single link arm in mowers whose frame assembly has a clear elevational path between plate 86 and idler support arms 74.

Figure 7:
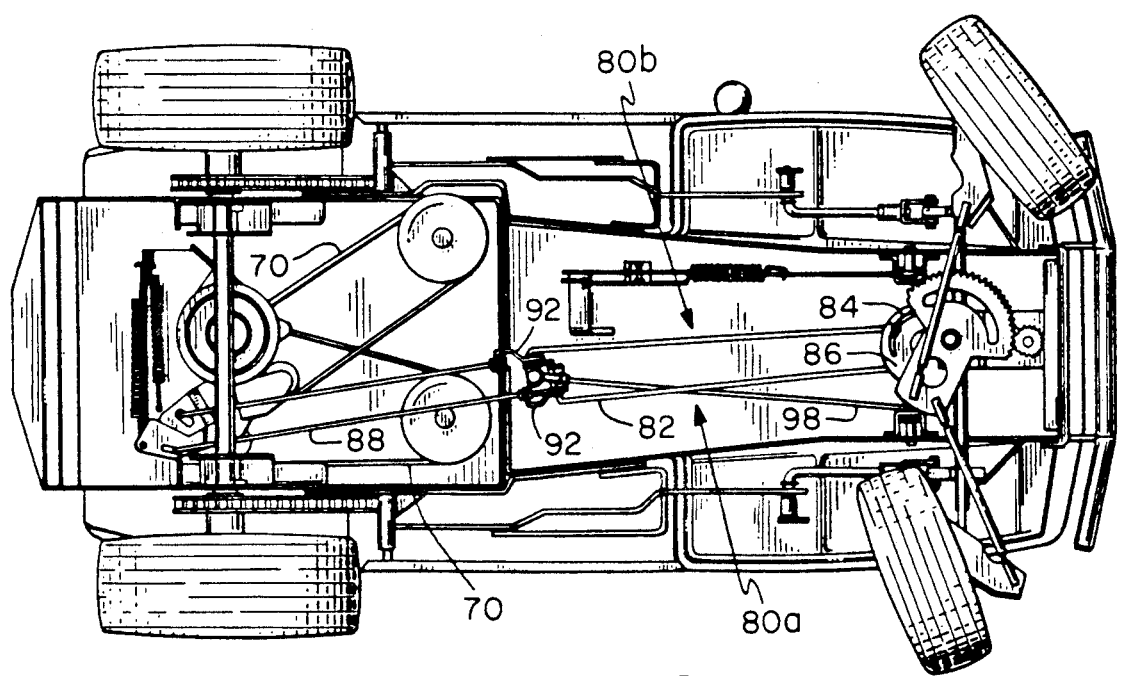
FIG. 7 is a bottom plan view similar to FIG. 5 of the riding mower shown in FIG. 1, in which the mower is illustrated as being sharply turned to the left.

In considering the operation of mower 2 with mower 2 travelling straight ahead, assume operator 2 wishes to make a sharp near ZTR type turn. Referring to FIGS. 5 and 7, as the operator turns steering wheel 20 to make a left turn, pinion 40 will be rotated clockwise when viewed from beneath as indicated by arrows A in FIG. 5. This in turn rotates toothed rack 42 and plate 86 in a counterclockwise direction as indicated by the arrows B. Rotation of rack 42 turns front wheels 24 to the left through the action of tie rods 46 to effect a left turn. See FIG. 7.

Rotation of plate 86 pulls left-hand linkage assembly 80a forwardly as the end of arcuate slot 84 immediately pushes forwardly on the front link arm 82 of this assembly as slot 84 rotates in a counter-clockwise direction. Since the other slot 84 is also rotating in a counterclockwise direction, the front link arm 82 of right-hand linkage assembly 80b is, in effect, at the back end, not the front end, of slot 84. Thus, the front end of link arm 82 of right-hand linkage assembly 80b has to traverse the entire length of slot 84 before counter-clockwise rotation of plate 86 can act on it to move it. Since the arcuate extent of slot 84 is chosen to be greater than the maximum angular rotation of plate 86, corresponding to the maximum degree of turn for the front wheels, right-hand linkage assembly 80b is unaffected by rotation of plate 86 and thus remains stationary. The terminology of left and right linkage assemblies refers to the side of mower 2 on which they operate as viewed from on top of mower 2.

As left-hand linkage assembly 80a is pulled forwardly, it does not immediately act on the pivotal support arm 74 to which it is attached since it is initially located approximately in the middle of slot 90. Linkage assembly 80a first has to move forwardly until it hits the end of slot 90. Then, as linkage assembly 80 continues to be pulled forwardly, it will also rotate arm 74 about its pivot point in a direction against the bias of spring 76 to move idler pulley 72 away from drive belt 70 and untension the belt. This declutches the transmission 62 supplying power to the left rear drive wheel 26 from the engine to allow such drive wheel 26, i.e. the traction wheel on the inside of the turn, to "freewheel". This allows near ZTR operation of mower 2 in conjunction with the sharp left turn simultaneously effected by front wheels 24.

The "lost-motion" connection provided by the positioning of linkage assembly 80 in the middle of slot 90 is desirable since it allows slight turns, e.g., 10°-30°, to the left or right without causing the inside rear wheel to be declutched. Only when a sharp turn is desired by the operator does the inside driven wheel declutch. Obviously, the degree of the "lost-motion" connection can be adjusted by adjusting the initial position of linkage assembly 80 in slot 90.

While only one linkage assembly 80 is pulled forwardly during sharp turns of mower 2, when it is desired to bring the mower to a complete stop, the operator pushes downwardly on both the clutch and brake pedals 94 and 96 located on floor pan 14. A clutch linkage 98 of any suitable type is operatively connected to the clutch pedal 92 and extends rearwardly therefrom to have a rear end located proximately to both of the linkage assemblies 80a and 80b at the location of brackets 92. As clutch linkage 98 is moved forwardly by depression of clutch pedal 94, its rear end acts on both linkage assemblies 80a and 80b simultaneously to declutch both of the rear drive wheels 26. This brings mower 2 to a stop in conjunction with a suitable braking mechanism for drive wheels 26 operated by depression of brake pedal 96.

Mower 2 according to the present invention has numerous advantages. It affords near ZTR operation in a machine having conventional steerable front wheels operated by a rotatable steering wheel. Accordingly, it is safer and more familiar for most people to use. It can turn very sharply due to the large angular degree front wheels 24 can be turned in conjunction with the declutching of the drive wheel 26 on the inside of the turn. In fact, mower 2 is better than a true ZTR machine since the declutched drive wheel is not positively braked but is allowed to freewheel and mower 2 is limited to approximately a maximum 80° turn. It has been found that these factors yield a mower that will not tear a divot in the turf as the machine turns since some small forward movement is still allowed for the declutched drive wheel. Mower 2 according to this invention thus has a minimum turning radius of approximately 4 inches.

In addition, since two separate transmissions are used, not a differential system, mower 2 does not speed up in turns. Thus, mower 2 is safer and more comfortable to use than true ZTR's as the operator does not feel as if the mower is tending to throw him off during a sharp turn. Mower 2 is thus easier to control especially for inexperienced operators. And, mower 2 is rugged and durable using mechanical draw-key transmissions.

While mechanical transmissions 62 have been disclosed herein and are preferred, hydrostatic transmissions or any other suitable transmission device could be used instead. All that is important is that such transmission allow the declutched drive wheel to "freewheel" rather than being positively braked or stopped. As noted earlier, such freewheeling allows sharp turns without tearing divots in the turf.

Various other modifications of this invention will be apparent to those skilled in the art. Thus, the scope of the present invention is to be limited only by the appended claims.

We claim:

1. An improved riding lawn mower, which comprises a frame supported for movement over the ground by a pair of steerable front wheels and a pair of rear wheels, a steering wheel on the frame connected to the front wheels for turning the front wheels relative to the frame for changing the direction of movement thereof, a prime mover carried on the frame, transmission means for driving the rear wheels from the prime mover, wherein the transmission means comprises dual independent transmissions each of which separately drives one rear wheel, wherein each transmission comprises a mechanical, variable speed transmission which is enclosed inside a transmission housing, and means operatively connected to the steering wheel for declutching the rear wheel on the inside of the turn in response to turning the front wheels.

2. An improved riding lawn mower as recited in claim 1, wherein the declutched rear wheel freewheels relative to the frame.

3. An improved riding lawn mower as recited in claim 1, wherein the transmissions comprise mechanical draw key transmissions.

4. An improved riding lawn mower as recited in claim 1, wherein the prime mover has an output shaft carrying a drive pulley, wherein each of the transmissions has an input pulley connected to the drive pulley by a drive belt, and further including means for normally tensioning the drive belts to transfer power to the transmissions.

5. An improved outdoor power equipment unit suited for traversing over turf, which comprises a frame supported for movement over the ground by a pair of steerable front wheels and a pair of rear wheels, steering means on the frame connected to the front wheels for rotating the front wheels relative to the frame for changing the direction of movement thereof, a prime mover carried on the frame, transmission means for driving the rear wheels from the prime mover, and linkage means operatively connected to the steering means for declutching the rear wheel on the inside of the turn in response to turning the front wheels, wherein the linkage means comprises lost motion means for declutching the rear wheel on the inside of the turn only after the front wheels have been turned through an angle greater than a predetermined minimum angle.

6. An improved outdoor power equipment unit suited for traversing over turf, which comprises a frame supported for movement over the ground by at least one steerable front wheel and a pair of rear wheels, steering means on the frame connected to the front wheel(s) for turning the front wheel(s) relative to the frame for changing the direction of movement thereof, a prime mover carried on the frame, transmission means for driving the rear wheels from the prime mover, wherein the transmission means comprises two mechanical, variable speed transmissions contained in transmission housings, wherein each transmission includes a high speed, low torque input shaft, a low speed, high torque output shaft, and speed changing means for selectively driving the output shaft at various speed relative to the input shaft, a separate direct chain drive extending between the output shaft of each transmission and one of the rear wheels such that each transmission directly and independently drives a single rear wheel, a separate tensionable belt drive extending between the prime mover and the input shaft of each transmission, and independent linkage assemblies connected to the steering means and the belt drives for untensioning the belt drive for only the transmission driving the rear wheel on the inside of a turn in response to turning the front wheel(s).

7. An improved riding lawn mower, which comprises a frame supported for movement over the ground by a pair of steerable front wheels and a pair of rear wheels, steering means on the frame connected to the front wheels for turning the front wheels relative to the frame for changing the direction of movement thereof, a prime mover carried on the frame, dual independent transmissions which separately drives each rear wheel from the prime mover, wherein each transmission comprises a mechanical, variable speed transmission which is enclosed inside a transmission housing, and linkage means operatively connected to the steering means and to the transmissions for declutching the rear wheel on the inside of the turn in response to turning the front wheels.

8. An improved riding lawn mower as recited in claim 7, wherein the transmissions comprise mechanical draw key transmissions.

9. An improved riding lawn mower as recited in claim 7, wherein each of the transmissions is operatively connected to the primer mover by a drive belt, and further including idler means for normally tensioning the transmission drive belts to power the transmissions from the prime mover, and wherein the linkage means is operatively connected to the idler means for selectively slackening one or the other of the drive belts to stop rotation of the corresponding transmission input shaft when a declutching operation is required for the corresponding rear wheel.

10. An improved riding lawn mower as recited in claim 9, wherein the linkage means comprises first and second independent linkage assemblies extending between the steering means and the idler means for each of the transmissions, wherein the linkage assemblies are connected to the steering means so that only one linkage assembly at a time is moved longitudinally relative to the frame when the front wheels are turned in one direction or the other.

11. An improved riding lawn mower as recited in claim 10, further including means extending between the linkage assemblies and a clutch pedal on the frame for simultaneously moving both of the linkage assemblies to simultaneously untension the drive belts of both transmission whenever the clutch pedal is depressed.

12. An improved riding lawn mower as recited in claim 10, wherein the linkage means comprises lost motion means for declutching the rear wheel on the inside of the turn only after the front wheels have been turned through an angle greater than a predetermined minimum angle.

13. An improved riding lawn mower as recited in claim 12, wherein the predetermined minimum angle is 30° or less.

14. An improved riding lawn mower as recited in claim 12, wherein each idler means is mounted on a pivotal support arm that is biased in a direction in which the drive belt is normally tightened by the idler means, wherein each support arm includes an elongated slot which receives a rear end of one linkage assembly intermediate the ends of the slot when the front wheels are located in a straight ahead orientation, the distance between the one end of the linkage assembly when so received in the slot and the end of the slot comprising the lost motion connection.

15. An improved riding lawn mower as recited in claim 14, wherein the steering means includes a plate rotatable with the steering means as the front wheels are turned, wherein the plate has two elongated slots with inner ends located adjacent one another with the slots extending arcuately outwardly therefrom to terminate in outer ends, wherein each linkage assembly has a front end located in one of the slots in engagement with the inner end of the slot when the front wheels are located in a straight ahead orientation such that rotation of the plate in one direction or the other causes the inner end of one of the slots to immediately begin moving one of the linkage assemblies relative to the frame while the front end of the other linkage assembly begins traversing the length of the other slot, and wherein the slots are sufficiently long so that the other linkage assembly does not reach the outer end of the slot before the maximum degree of turn for the front wheels is reached.

16. An improved riding lawn mower as recited in claim 15, wherein the steering means includes stops for preventing the front wheels from being turned more than approximately 80°.

17. An improved riding lawn mower as recited in claim 7, wherein the steering means includes a rotatable steering wheel.

18. An improved riding lawn mower as recited in claim 7, wherein the declutched rear wheel freewheels relative to the frame.

19. An improved riding lawn mower, which comprises a frame supported for movement over the ground by a pair of steerable front wheels and a pair of rear wheels, steering means on the frame connected to the front wheels for rotating the front wheels relative to the frame for changing the direction of movement thereof, a prime mover carried on the frame, transmission means for driving the rear wheels from the prime mover, and linkage means operatively connected to the steering means for declutching the rear wheel on the inside of the turn in response to turning the front wheels, wherein the linkage means comprises lost motion means for declutching the rear wheel on the inside of the turn only after the front wheels have been turned through an angle greater than a predetermined minimum angle.

20. An improved riding lawn mower as recited in claim 19, wherein the transmission means includes two drive belts for providing power to each of the rear wheels, respectively, and two rotatable idler assemblies spring biased to normally tension each drive belt, respectively, and wherein the linkage means comprises first and second independent linkage assemblies extending between the steering means and the idler assemblies, respectively, so that the steering means pulls on only one linkage assembly as the front wheels are sufficiently turned in one direction or the other with the other linkage assembly remaining stationary.

21. An improved riding lawn mower as recited in claim 20, further including means extending between the linkage assemblies and a clutch pedal on the frame for simultaneously pulling on both of the linkage assemblies to simultaneously untension both drive belts whenever the clutch pedal is depressed.

22. An improved riding lawn mower as recited in claim 20, wherein each idler assembly includes an elongated slot which receives one end of one linkage assembly intermediate the ends of the slot when the front wheels are located in a straight ahead orientation, the distance between the one end of the linkage assembly when so received in the slot and the end of the slot comprising the lost motion connection.

23. An improved outdoor power equipment unit suited for traversing over turf, which comprises a frame supported for movement over the ground by a pair of steerable front wheels and a pair of rear wheels, a steering wheel on the frame connected to the front wheels for turning the front wheels relative to the frame for changing the direction of movement thereof, a prime mover carried on the frame, transmission means for driving the rear wheels from the primer mover, wherein the transmission means comprises dual independent transmissions each of which separately drives one rear wheel, wherein each transmission comprises a mechanical, variable speed transmission which is enclosed inside a transmission housing, and means operatively connected to the steering wheel for declutching the rear wheel on the inside of the turn in response to turning the front wheels.

24. An improved outdoor power equipment unit suited for traversing over turf, which comprises a frame supported for movement over the ground by a pair of steerable front wheels and a pair of rear wheels, steering means on the frame connected to the front wheels for turning the front wheels relative to the frame for changing the direction of movement thereof, a prime mover carried on the frame, dual independent transmissions which separately drive each rear wheel from the prime mover, wherein each transmission comprises a mechanical, variable speed transmission which is enclosed inside a transmission housing, and linkage means operatively connected to the steering means and to the transmissions for declutching the rear wheel on the inside of the turn in response to turning the front wheels.

25. An improved outdoor power equipment unit suited for traversing over turf, which comprises a frame supported for movement over the ground by at least one steerable front wheel and a pair of rear wheels, steering means on the frame connected to the front wheels(s) for turning the front wheel(s) relative to the frame for changing the direction of movement thereof, a prime mover carried on the frame, transmission means for driving the rear wheels from the prime mover, and first and second independent linkage assemblies operatively connected to the steering means and to the transmission means for declutching the rear wheel on the inside of the turn in response to turning the front wheel(s), wherein the steering means includes a plate rotatable with the steering means as the front wheel(s) are turned, wherein the plate has two elongated slots with inner ends located adjacent one another with the slots extending arcuately outwardly therefrom to terminate in outer ends, wherein each linkage assembly has a front end located in one of the slots in engagement with the inner end of the slot when the front wheel(s) are located in a straight ahead orientation such that rotation of the plate in one direction or the other causes the inner end of one of the slots to begin moving one of the linkage assemblies relative to the frame while the front end of the other linkage assembly begins traversing the length of the other slot, and wherein the slots are sufficiently long so that the other linkage assembly does not reach the outer end of the slot before a predetermined maximum degree of turn for the front wheel(s) is reached.

26. An improved riding lawn mower as recited in claim 25, wherein the linkage means comprises lost motion means for declutching the rear wheel on the inside of the turn only after the front wheel(s) have been turned through an angle greater than a predetermined minimum angle.

27. An improved riding lawn mower as recited in claim 26, wherein the transmission means includes two movable support arms the movement of which declutches the rear wheels, wherein each support arm includes an elongated slot which receives a rear end of one linkage assembly intermediate the ends of the slot when the front wheel(s) are located in a straight ahead orientation, the distance between the one end of the linkage assembly when so received in the slot and the end of the slot comprising the lost motion connection.

* * * * *